Figure 1:
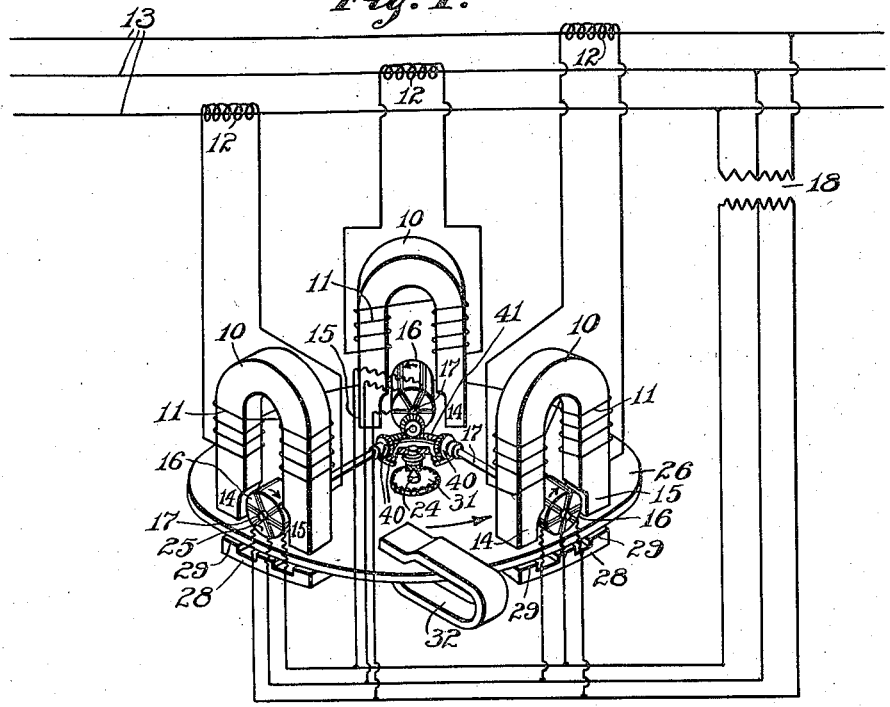

Nov. 1, 1927. 1,647,332

D. J. ANGUS

VECTOR SUM VOLT AMPERE METER

Filed May 15, 1922

INVENTOR.
Donald J. Angus,
BY
ATTORNEY.

Patented Nov. 1, 1927.

1,647,332

UNITED STATES PATENT OFFICE.

DONALD J. ANGUS, OF INDIANAPOLIS, INDIANA, ASSIGNOR TO WESTINGHOUSE ELECTRIC & MANUFACTURING COMPANY, A CORPORATION OF PENNSYLVANIA.

VECTOR-SUM VOLT-AMPERE METER.

Application filed May 15, 1922. Serial No. 561,144.

It is the object of my invention to measure the vector sum of the volt-amperes of the several phases of a polyphase alternating-current circuit.

In my Canadian Patent No. 217,581, granted April 11th 1922, I have shown a volt-ampere meter in conjunction with which my present invention is especially applicable. In such Canadian patent I have also shown a polyphase arrangement in which the arithmetical sum, as distinguished from the vector sum, of the volt-amperes of the several phases of a polyphase alternating-current circuit is measured. In such last-named arrangement, there were shown three actuators acting in common on a meter disk, the three actuators being responsive to the currents in the three phases of the circuit. Each actuator consisted of a field magnet having poles in proximity to the meter disk, with a rotatably shiftable armature between such poles and also in proximity to the meter disk.

One of the elements of each actuator was excited in proportion to the voltage and the other in proportion to the current of the alternating-current circuit, the three actuators being responsive to the currents in the respective phases of the circuit, as already stated; and one of the elements, the armature as shown, was excited to produce a rotating field. As a result of this construction, the armature of each actuator would rotatably shift upon changes in the power-factor in the circuit to maintain a fixed phase relationship between the fields of the field magnet and the armature, and thus a fixed phase relationship between the fluxes which cut the meter disk and were produced by such field magnet and armature respectively.

Such construction as illustrated was essentially a single-phase device, with respect to the current, and a sufficient number was used to meter the polyphase circuit; three actuators, for instance, being used for a three-phase circuit, each actuator measuring the volt-amperes in one line-wire with relation to the potential-difference between the line-wire and the neutral. The several actuators were all independent of one another, in their actions, and the torques of the several actuators were added arithmetically to one another in their effect on the meter disk, regardless of the relative phase displacements of the currents in the different phases. Therefore, such an arrangement of actuators gives the arithmetical sum of the volt-amperes in the several line-wires, each measured with respect to the neutral point of the system.

According to the present invention, the measuring of the vector sum, rather than of the arithmetical sum, of the volt-amperes of the several phases is obtained. The vector sum of the volt-amperes of the several phases of a polyphase circuit is a resultant value of volt-amperes which may be determined by vectorially combining the arithmetical sum of the power components of volt-amperes, or the watts, of the several phases with the arithmetical sum of the "wattless" components of the volt-amperes of the several phases. The same resultant may be computed algebraically by determining the square root of the sum of the squares of these two arithmetical sums. In other words, if $P_1$, $P_2$ and $P_3$ represent the power components of the volt-amperes of the respective phases of a three-phase circuit and $Q_1$, $Q_2$ and $Q_3$ represent the "wattless" components of the volt-amperes of the corresponding phases, the vector sum volt-amperes of the three-phase circuit will be equal to $$\sqrt{(P_1+P_2+P_3)^2+(Q_1+Q_2+Q_3)^2}.$$

Briefly stated in connection with the specific embodiment of my invention illustrated, I obtain a vector-sum volt-ampere meter by interconnecting the movable elements or armatures of the several actuators of the aforesaid polyphase metering arrangement, so that a movement of one armature affects the positions of all the armatures, and the armatures will each take positions which are the resultant of the moving forces acting on all the armatures. The several actuators are so electrically connected to the circuit that when the power factors in all the phases are the same the several armatures are all in the positions they would have if the aforesaid mechanical interconnection were not made. In other words, the rotating fields in the several interconnected armatures are displaced from one another by angles corresponding to those between the voltages in the several phases of the circuit; or by 120°, for instance, for a three-phase circuit.

Figure 2:
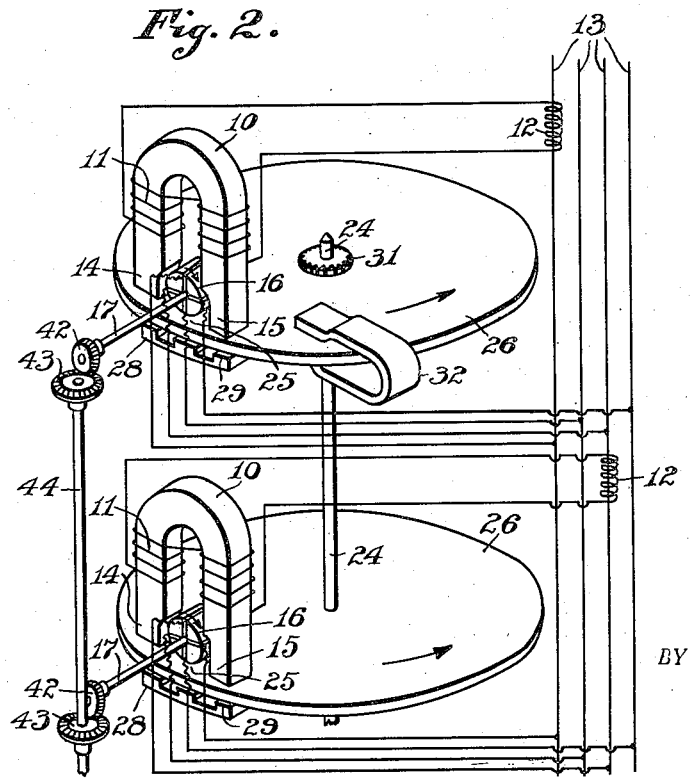
Figure 3:
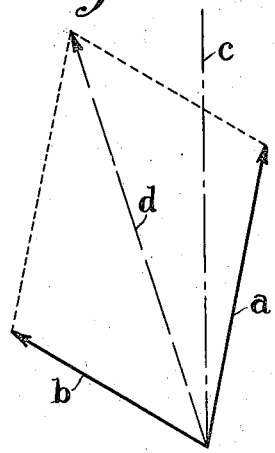

The accompanying drawing illustrates my invention: Fig. 1 is a perspective view, in semi-diagrammatic form, of an integrating three-phase vector-sum volt-ampere meter embodying my invention, in a preferred form, with the electrical connections diagrammatically indicated, and with one form of mechanical interconnection between the armatures of the several actuators; Fig. 2 is a perspective view, in semi-diagrammatic form, of an integrating two-phase sector-sum volt-ampere meter embodying my invention, also with the electrical connections diagrammatically indicated, and with another form of mechanical interconnection between the armatures of the two actuators; and Fig. 3 is a vector diagram designed to aid in understanding the action.

In the preferred form of my invention, illustrated in the drawing, the meter has a plurality of actuators, hereinafter described, for moving a meter element. These may be varied in number as explained in my aforesaid Canadian patent, Fig. 1 showing three actuators and Fig. 2 showing two actuators. The actuators are preferably all alike, save that the current (or the voltage) elements of the several actautors are connected to different current phases as indicated in Figs. 1 and 2. For an understanding of the actuators per se, it will be necessary to describe only a single actuator, in which I shall assume the armature to have a voltage winding and the field magnet to have a current winding, with the armature winding producing a rotating field.

Each actuator has a field magnet 10 with an exciting winding 11, here connected, through a current transformer 12 as shown, to carry a current proportional to that in a leg of the alternating-current circuit 13, shown as a three-phase circuit in Fig. 1 and as a two-phase circuit in Fig. 2. The three current windings of the three actuators in Fig. 1 are connected respectively to the three phases of the three-phase circuit 13 in that figure; and, similarly, the two current windings of the two actuators in Fig. 2 are connected respectively to the two phases of the two-phase circuit 13 in that figure. Between the two pole pieces 14 and 15 of the field magnet 10 of each actuator is an armature 16, mounted on a shaft 17 so that it can shift rotatably about the axis of said shaft. This armature is here provided with exciting windings excited in proportion to the voltage of the circuit 13, as shown through a voltage transformer 18. The exciting windings are divided into the proper number of parts, according to the number of phases of the circuit, in proper inter-relation to produce a rotating field, which is assumed to rotate in the direction of the arrow on each actuator.

Arranged in proximity to the pole pieces 14 and 15 of the field magnet 10, and to the armature 16 at a point 25 midway between such pole pieces, is a meter disk 26, still referring to the specific embodiment of my invention shown. There may be a single meter disk, common to all the actuators, as indicated in Fig. 1; or there may be a separate meter disk for each actuator, as indicated in Fig. 2. The action of the actuator on the meter disk is the same in both cases; and when there is more than one meter disk, all the meter disks are rigidly connected by a common supporting shaft 24.

For each actuator, the meter disk 26 is in inductive relation to the pole pieces 14 and 15 and to the point 25, so that eddy currents are induced in it by the flux from these points. On the opposite side of the disk 26 from the field member 10 and armature 16 is a member 28 of magnetic material for reducing the reluctances of the various magnetic circuits. The member 28 is preferably adjustable toward and from the disk 26, for purposes of calibration, and is provided with fingers 29 projecting toward the disk opposite the pole pieces 14 and 15 and the point 25. The disk 26 is any suitable meter disk, for an integrating or indicating or a recording meter as desired, as explained in my aforesaid Canadian patent, being suitably mounted on pivot bearings on the ends of its supporting shaft 24, which is shown in Figs. 1 and 2 as having a pinion 31 by which the disk or disks may be connected to integrating mechanism through suitable gearing. The disk or disks 26 are restrained in their movements, ordinarily by one or more drag magnets 32 when the disk is an integrating meter as illustrated.

In operation, the armature 16 of each actuator is free to move about the axis of its shaft 17, (save as limited by the interconnection of the actuators as hereinafter described,) but does not completely rotate thereon, merely changing position on its axis as the relative phase position of the current and voltage—that is, the power factor,—in its phase of the circuit 13 changes. This change in position is such, (or at least tends to be such save as modified by the interconnection between the actuators to be described later,) by reason of the reaction between the magnetic fields of the field-magnet and the armature, that the voltage-produced magnetic flux of the rotating field of the armature will be in line with the current-produced magnetic flux between the poles of the field magnet when the latter is at its maximum value, regardless of the power factor. Consequently, the voltage-produced flux at the point 25 will be 90° out of phase with the current-produced field-magnet flux. In other words, ignoring for the moment the effect of the interactuator connection, the rotating field of the armature is always kept in phase of the field-magnet with respect to a line through the poles of the field magnet regardless of the power-factor of the circuit, and so always in quadrature with such field-magnet field with respect to a line at right angles to such line through the field-magnet poles.

In consequence of this, assuming the field rotation to be in the direction of the arrow, there is a pole travel, of the two poles alternately, from the pole piece 14 to the point 25 and then to the pole piece 15. The point 25 is a point in space on the armature midway between the two pole pieces 14 and 15, regardless of the position the armature itself takes; and the progressive pole travel referred to takes place for all positions the armature may assume, and regardless of the power-factor of the circuit 13. The pole travel does this uniformly if the armatures of the several actuators are not interconnected, and also if they are interconnected and the power factors of the several phases are the same, as hereinafter explained.

This progressive pole travel pulls forward the meter disk or disks 26, in the direction of such pole travel. This pull is due to the fact that the eddy currents in the disk or disks around points beneath the pole pieces 14 and 15 are in quadrature with the fields of such pole pieces, and therefore in phase with the field at the point 25, with which latter field such eddy currents react; and to the fact that the eddy currents in the disk around a point beneath the point 25 are in quadrature with the field at such point 25, and therefore in phase with the fields of the pole pieces 14 and 15, with which latter fields such eddy currents react. Both of these reactions tend to pull the disk 26 forward; and, if the actuators are not interconnected, the combined pull from both of such reactions is proportional to the volt-amperes of that phase of the circuit 13 to which that actuator is connected.

As so far described, the structure is as set forth in my Canadian patent.

With such structure as so far described, the effects of the different actuators on the shaft 24, whether through one or a plurality of meter disks, are arithmetically cumulative. Each actuator acts on its meter disk independently, to produce a torque proportional to the volt-amperes of the particular phase to which that actuator is responsive; and the total torque on the shaft 24 is the arithmetical sum of these individual torques.

This torque proportional to the arithmetical sum of the volt-amperes of the several phases is obtained when the armatures of the several actuators are not interconnected, and the actuators are entirely independent of one another.

According to my present invention, I interconnect the armatures of all the actuators of the meter—that is, the armatures of the three actuators of the three-phase meter in Fig. 1, and the armatures of the two actuators of the two-phase meter in Fig. 2. This interconnection may be made in any convenient way. In the arrangement shown in Fig. 1, where the actuators all act on a common meter disk, a convenient interconnection is obtained by providing bevel pinions 40 on the inner ends of the shafts 17, all of which bevel pinions 40 mesh with a common bevel gear 41 coaxial with the shaft 24 but movable independently thereof. In the arrangement shown in Fig. 2, where the actuators act on separate meter disks, a convenient interconnection is obtained by providing bevel pinions 42 on the outer ends of the shafts 17, which bevel pinions 42 mesh with bevel gears 43 all fixed in common on a vertical shaft 44 parallel to the shaft 24 beyond the periphery of the meter disks.

The connections of the rotating-field-exciting windings of the armatures of the several actuators to the exciting circuit 13 are shifted relatively to one another by angles corresponding to the angles between the different phases of the circuits—120° for a three-phase circuit, and 90° for a two-phase circuit, etc. This shifting takes care of itself automatically by the movements of the armatures when the armatures are not interconnected; and may be made to take place automatically when the armatures are to be interconnected, if the armatures are left mechanically disconnected from one another until after the armatures have taken their proper positions with all the phases at unity (or at equal) power-factors.

By reason of this interconnection of the armatures of the several actuators, the total torque on the meter shaft 24 is proportional to the vector sum, instead of the arithmetical sum, of the volt-amperes of the several phases of the circuit. The vector sum and the arithmetical sum are the same when the power factors in the several phases are the same, but the vector sum is less than the arithmetical sum when the power factors in all the phases are not the same.

This is clear from the diagram of Fig. 3. In this diagram, which for simplicity is taken for a two-phase circuit, let the line $a$ indicate the volt-amperes in one phase of the circuit, and the line $b$ indicate the volt-amperes in the other; and let the angles of such lines $a$ and $b$ to the vertical reference-line $c$ indicate the lead or lag of the currents of the respective phases, so that as shown, the power-factor of the volt-amperes $a$ is a leading power-factor and that of the volt-amperes $b$ is a lagging power-factor. If the armatures of the several actuators were not interconnected, each actuator would act on its meter disk, in proportion to the volt-amperes of its phase, because its armature would take the position to which it tends to move as above described; and in consequence the total torque on the shaft 24 would be proportional to the arithmetical sum of the lines $a$ and $b$—that is, to the arithmetical sum of the volt-amperes in all the phases of the circuit.

However, when the armatures are interconnected, the total torque on the shaft 24 is no longer proportional to the arithmetical sum of the two lines $a$ and $b$, but is proportional to the vector sum $d$ of such two lines. This vector sum $d$ is obtained in the diagram by completing the parallelogram of forces for the vectors $a$ and $b$ in Fig. 3; and this vector sum is less than the arithmetical sum save when the vector lines $a$ and $b$ are coincident in angle, which is when the power-factors of the phases are all the same. The diagram of Fig. 3 shows the vector summation for but two phases; but the vector summation for a greater number of phases is obtained in the same way, in the usual manner of compounding more than two forces, and does not require specific explanation.

This vector summation of the volt-amperes is obtained in the actual device as follows: Assume that to begin with the power-factors in all the phases are the same, so that the vector sum is the arithmetical sum. The armatures of the several actuators then actually take the positions to which they tend to move by the individual actuator action above explained. These armature positions are the same under these conditions whether the armatures are interconnected or not. Assume now that the power-factor in one of the phases changes, but that those in the other phases do not change. The armature of the actuator for the phase whose power-factor changed tends now to move to a new position, by its interaction with its field-magnet as above explained. However, as it thus tries to move, it must move with it the armatures of the other actuators, because of their mechanical interconnection; and they tend to resist this movement. In consequence, all the armatures take a resultant or compromise position, where the several forces tending to move the armatures of the several actuators are balanced. The armature of the actuator for the phase having the changed power-factor has not moved as far as it would go if it were free from the armatures of the other actuators, but the other actuators have been moved from the positions which they would have retained if it had not been for the effect of the power-factor change on the first armature. In this condition, the rotating field of each armature is not quite in phase with the field of its field-magnet with respect to a line through the poles of such field-magnet, though it has a component which is in phase therewith; and is not quite in quadrature with such field-magnet field with respect to a line at right angles to such line through the field-magnet poles, though it has a component which is in quadrature therewith. This last-named component, instead of the full-rotating field, reacts with the eddy currents beneath the pole pieces 14 and 15; to produce the eddy currents in the meter disks which react with the fields of the pole pieces 14 and 15; and therefore it is the product of this component with the flux of the field-magnet field which tends to pull the meter disk forward. The sum of these pulls for all the meter elements is substantially proportional to the vector sum of the volt-amperes of the several phases of the circuit 13.

I claim as my invention:

1. A vector-sum volt-ampere meter for polyphase circuits, comprising a plurality of actuators, each actuator having a field magnet and a rotatable armature associated with the field magnet, the windings of said field magnet and said armature being responsive one to voltage and the other to current, and the windings of the armature being arranged to produce a rotating field, said actuators being arranged to be electrically connected to the respective phases of a polyphase circuit, and a movable meter element having parts in position to be acted on by the magnetic fields of both the field-magnets and the armatures of all said actuators, the armatures of all the actuators being mechanically interconnected so that the movement of any one affects the others.

2. A vector-sum volt-ampere meter for polyphase circuits, comprising a plurality of actuators each of which has means for producing two magnetic fields responsive respectively to the voltage and to one phase of the current of an alternating-current circuit, at least one of said fields being a rotating field, and for tending to move the field-producing means of one of said two fields relatively to that of the other on variations in the power-factor of the associated phase of the circuit to tend to substantially maintain a fixed phase relationship between said two fields regardless of such variations; and means interconnecting the several actuators to modify such movement of the field-producing means in one actuator by the tendency to produce such movement in another actuator.

3. A vector-sum volt-ampere meter for polyphase circuits, comprising a plurality of actuators each of which has means for producing two magnetic fields responsive respectively to the voltage and to one phase of the current of an alternating current circuit, at least one of said fields being a rotating field, said field-producing means being arranged so that the two magnetic fields in each actuator react upon each other to tend to produce movement of the field-producing means of one of said two fields relatively to that of the other on variations in the power-factor of the associated phase of the circuit to tend to substantially maintain a fixed phase relationship between said two fields regardless of such variations; and means interconnecting the several actuators to modify such movement of the field-producing means in one actuator by the tendency to produce such movement in another actuator.

4. A volt-ampere meter, comprising a plurality of actuators each of which has means for producing two magnetic fields responsive respectively to the voltage and to one phase of the current of a polyphase alternating current circuit, at least one of said fields being a rotating field; a meter element having parts co-operating with all said actuators and in position to have both fields of each actuator induce therein currents which react respectively with the other field of the same actuator from that which induces them to produce a pull on such meter element; and means interconnecting the several actuators to modify the phase relationship of the two fields of each actuator by the phase relationship of the fields of another actuator.

5. A volt-ampere meter, comprising a plurality of actuators each of which has means for producing two magnetic fields responsive respectively to the voltage and to the current of one phase of a polyphase alternating current circuit, one of said fields being advanceable and retardable to compensate for variations in the power-factor of said phase; a meter element having parts in position to be acted on by both fields of all said actuators; and means for modifying the advance and retardation of said advanceable and retardable field in each actuator by the retardation and advance of the advanceable and retardable field in another of said actuators.

6. A volt-ampere meter, comprising a plurality of actuators each of which has meter elements having current and voltage windings, means for connecting the current and voltage windings of the several actuators for energization respectively in proportion to the currents in the respective phases and to the voltage of a polyphase alternating-current circuit, the aforesaid parts for each actuator including two members movable relative to each other and each provided with field-producing windings, said two members being arranged so that the windings of one are in the magnetic field which the windings of the other produce, at least one of said fields being a rotating field, said members for each actuator being arranged to be varied in relative position by the interacting of said two fields in accordance with variations in the phase relationship of the current and voltage in such circuit and by such variations to offset the change which such variation of the phase relationship of the current and voltage in said circuit would produce in the current and voltage fluxes in said actuator and thus to tend to maintain substantially fixed the phase relationship of said voltage and current fluxes, and means for interconnecting the relatively movable members of the several actuators so that a relative movement in one actuator effects a relative movement in the other or others to modify the aforesaid offsetting.

7. A volt-ampere meter, comprising a plurality of actuators each of which has meter elements having current and voltage windings, means for connecting the current and voltage windings of the several actuators for energization respectively in proportion to the currents in the respective phases and to the voltage of a polyphase alternating-current circuit, the aforesaid parts for each actuator including a movable member which is varied in position according to the variations in the phase relationship of the current and voltage in one phase of such circuit and which by such variations tends to offset the change which such variation in the phase relationship of the current and voltage in said circuit would produce in the current and voltage fluxes in that actuator and thus tends to maintain substantially fixed the phase relationship of said voltage and current fluxes, and means for modifying such offsetting by the phase relationship between the current and voltage in other phases of the circuit.

8. A vector-sum volt-ampere meter for alternating-current circuits, comprising a plurality of actuators and a movable meter element on which said actuators act jointly, means for connecting the actuators to a polyphase alternating current circuit to be responsive respectively to the current of the respective phases and to the voltage of said circuit, the aforesaid parts including means for each actuator tending to cause it to produce a torque on said movable meter element proportional to the volt-amperes of the circuit-phase corresponding to that actuator, and means for affecting the torque of each actuator upon differences occurring in the power factors between the several phases of the circuit.

9. A vector-sum volt-ampere meter for alternating-current circuits, comprising a plurality of actuators and a movable meter element on which said actuators act jointly, means for connecting the actuators to a polyphase alternating current circuit to be responsive respectively to the current of the respective phases and to the voltage of said circuit, the aforesaid parts including means for each actuator tending to cause it to produce a torque on said movable meter element proportional to the volt amperes of the circuit-phase corresponding to that actuator, and means interconnecting the several actuators for affecting the respective torques produced by them in accordance with variations between the power factors of the several phases of the circuit.

10. A vector-sum volt-ampere meter for polyphase alternating-current circuits, comprising a movable meter element, means for producing a plurality of torques on said meter element, said means including means tending to maintain each torque proportional to the volt amperes of one phase of the circuit, and means for affecting such torques so that their sum is proportional to the vector sum of the volt amperes of the several phases.

11. A vector-sum volt-ampere meter for polyphase circuits, comprising a plurality of actuators, each actuator having a field magnet and a rotatable armature associated with the field magnet, the windings of said field magnet and said armature being responsive one to voltage and the other to current, and the windings of the armature being arranged to produce a rotating field, said actuators being arranged to be electrically connected to the respective phases of a pollyphase circuit, and a movable meter element having parts in position to be acted on by the magnetic fields of both the field-magnets and the armatures of all said actutors, the armatures of all the actuators being interconnected so that the movement of any one affects the others.

12. A vector-sum volt-ampere meter for alternating-current circuits, comprising a movable meter element, means for producing torque on said meter element, said means tending to maintain said torque proportional to the arithmetical sum of the volt-amperes of the several phases of a polyphase alternating current circuit, and means for counteracting such tendency sufficiently to reduce such torque to a value porportional to the vector-sum of the volt amperes of said several phases.

13. A vector-sum volt-ampere meter for alternating-current circuits, comprising a movable meter element, torque-producing means acting on said meter element, said torque-producing means being provided with means for varying the torque produced thereby on the movable meter element in proportion to the vector sum of the volt amperes of the several phases of an alternating current circuit.

14. A vector-sum volt-ampere meter for alternating-current circuits, comprising a movable meter element having conductive parts in which eddy currents may be induced, and means for inducing a plurality of sets of eddy currents in said movable meter element and for tending to react with each set of eddy currents with a force proportional to the volt-amperes of one phase of a pholyphase alternating current circuit, and means for modifying such reactions so that the sum of their forces is proportional to the vector sum of the volt-amperes of a polyphase alternating current circuit.

15. A volt-ampere meter comprising a movable element, a plurality of actuating means therefor each tending to move the element in accordance with the volt-amperes of one of the phases of a polyphase circuit, and means mechanically cooperating with each of the actuating means whereby the element is moved in accordance with a resultant effect of the actuating means.

In witness whereof, I have hereunto set my hand at Indianapolis, Indiana, this eleventh day of May, A. D. one thousand nine hundred and twenty two.

DONALD J. ANGUS.